United States Patent Office 3,412,127
Patented Nov. 19, 1968

3,412,127
ALKYLALUMINUM OXIDATION PROCESS
Donald R. Napier, Ponca City, Okla., assignor to Continental Oil Company, Ponca City, Okla., a corporation of Delaware
No Drawing. Filed Oct. 22, 1965, Ser. No. 502,448
9 Claims. (Cl. 260—448)

ABSTRACT OF THE DISCLOSURE

Aluminum trialkyls are oxidized initially at a temperature below about 20° C., gradually reducing the temperature until the oxygen uptake decreases to a rate too low to be practical, adding a low-molecular-weight metal alkyl, increasing the temperature at about 20° C. or above and completing the oxidation. Such procedure is said to reduce the formation of impurities by side reactions.

---

This invention relates to an improved method of oxidizing trialkylaluminum to produce aluminum trialkoxide, and more particularly the present invention is concerned with the reduction of the amount of impurities formed by prior art methods. In the following description, aluminum trialkyl and trialkyl are used interchangeably.

Alcohols can be produced by the hydrolysis of aluminum trialkoxides. The trialkylaluminums from which the alkoxides are produced can be derived from the well known growth reaction between a low molecular trialkylaluminum and an alpha-olefin, such as ethylene. An important step in the overall-process is the oxidation of the higher molecular weight trialkylaluminum into the corresponding aluminum trialkoxides. Unfortuniately, in the oxidation step, side reactions occur resulting in the formation of such by-products as aldehydes, esters and hydrocarbons. This formation of by-products increases with temperature; consequently, it is preferable to conduct the process at the lowest temperature which is consistent with a reasonable reaction rate.

It is believed that during the oxidation step, peroxides are formed which react as follows:

(RCH$_2$O)$_2$Al OOR → OALOCH$_2$R + RCHO
+ RCO$_2$CH$_2$R + RCH$_2$OH + related by-products In my Patent 3,097,226 issued July 9, 1963, I proposed one approach to the problem. In that patent it was proposed to initially conduct the oxidation at somewhat higher than room temperature, e.g. 25 to 70° C. until 50 to 65% oxidation had taken place, the reaction mass was then cooled to below room temperature, e.g. —10 to 15° C. and the oxidation completed. This was satisfactory since the decomposition products are predominately formed during the latter third of the oxidation reaction. However, there are two primary disadvantages to this method. First, the oxidation rate at the cool temperatures is lowest toward the end of the reaction and secondly, low-temperature (e.g. 0° C.) oxidation of pure trialkylaluminum is characterized by the formation, at two-thirds of reaction, of solids and simultaneously a pronounced decrease in the rate of oxygen uptake. This solid formation also results in an heterogeneous mixture of reaction product.

I have now found low-temperature oxidation of growth product can consistently be effected without complications and a homogeneous solution obtained. This invention is concerned with such an improved method, and accordingly such method constitutes an important object thereof.

Another object is to provide a substantially more economical method of oxidizing mixed aluminum trialkyls to produce aluminum trialkoxides.

Other objects and advantages will become apparent from the following explanation and description of the invention.

In accordance with the present invention, aluminum mixed trialkyls having alkyl groups which contain from about 4 to 30 carbon atoms or more are oxidized initially by means of an oxygen-containing gas at a temperature below room temperature, e.g. —10 to 20° C., preferably initially 10 to 15° C. dropping preferably to —5 to 5° C. at the end of the oxygen input and until the oxygen uptake rate becomes too low to be practical, a metal trialkyl or a metal alkyl hydride is added wherein the alkyl groups contain 2 to 4 carbon atoms, and the oxidation completed preferably as temperature is increased to room temperature or above, e.g. 20° to 50° C.

It is believed the peroxides formed during the initial oxidation react as follows:

Me is a metal such as aluminum, boron, lithium or alloys of such metals. R is an alkyl of 1 to about 30 carbon atoms. R′ is R, H or combinations depending upon valance of Me.

In oxidizing mixed trialkylaluminums, including growth product, at sub-normal temperatures (specifically around 0° C.), the homogeneous solutions thereby produced contain, in addition to aluminum alkoxides, appreciable amounts of alkylperoxyaluminums, generally 10 to 30 mol percent. Additions of alkylmetals or alkylmetal hydrides to the cold, oxidized solutions converts virtually all of the peroxidic product to aluminum alkoxides and/or alcohols. The reduced solution is then further oxidized to obtain more complete conversion of the less readily oxidizable portion of the product (e.g. the higher molecular weight alkylaluminums) at the expense of the reducing agent. Thus, it is preferred to use excess reducing agent. In general, the alkylaluminus will be oxidized in the presence of an inert solvent such as paraffinic hydrocarbons, aromatic hydrocarbons and the like. The paraffinic hydrocarbons can be normal, branched chain or cyclic, and will generally contain 6 to 14 carbon atoms, such as n-hexane, isooctane, n-decane, n-dodecane, cyclic hexane and the like. Suitable aromatic hydrocarbons include benzene, toluene, naphthalene, anthracene and the like. Other inert solvents which are fluid at the operating conditions can also be employed as is well known to the art.

The method of this invention is applicable broadly to admixtures of high molecular weight alkylaluminum, and is particularly directed to the oxidation of high molecular weight alkylaluminums which are obtained through the conversion of low molecular weight alkylaluminums by reaction with ethylene. In this method for the preparation of alcohols, an algylaluminum such as triethylaluminum, is reacted with a low molecular weight alpha-olefin, such as ethylene, to form a "growth" product, said product comprising trialkylaluminum compounds in which the alkyl groups vary widely in molecular weight. The growth reaction can be illustrated equation-wise as follows:

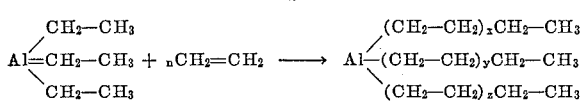

wherein $x$, $y$ and $z$ represent integers ranging from 0 to about 28 and $x+y+z=n$. The growth reaction is carried out by passing ethylene through triethylaluminum preferably in the presence of an inert diluent under a wide variety of reaction conditions, for example, 65 to 155° C. and 200 to 5000 p.s.i.g., preferably 90 to 120° C. and 1000 to 3500 p.s.i.g. Although triethylaluminum is the preferred alkylaluminum, other low molecular weight aluminumalkyls, such as tripropylaluminum, tributylaluminum, triisobutylaluminum, diethylaluminum hydride, ethylaluminum dihydride, etc. can be employed.

It has been found that the growth reaction provides a statistical distribution of alkyl chain lengths characterized by the Poisson relationship, which can be expressed as:

$$P_{(n)} \frac{m^n e^{-m}}{n}$$

wherein $P_{(n)}$ represents the probability that a certain hydrocarbon radical will be formed by $n$ additions of ethylene to the aluminum-ethyl bond originally present and $m$ is the mean number of additions of ethylene per growing chain. In general, $m$ will range from 2 to 6 in a typical growth product.

The oxidation of such a product is done, according to this invention in two stages. The first-stage oxidation is done at a temperature below normal temperature, e.g. below 25° C. and preferably at a temperature in the range −5 to 5° C., although the initial temperature can be as high as 15 to 20° C. An oxygen-containing gas is passed through the trialkylaluminum mixture in an amount of 1.1 to 1.3 of the theoretical amount required for the oxidation which is about 600 to 1000 standard cubic feet of oxygen per pound mol aluminum in the trialkylaluminum abbreviated as s.c.f. (measured at 0° C. and 760 mm. Hg.). The gas can be pure oxygen or an oxygen-containing gas, preferably air. When air is utilized, the preferred rate of gas introduction is about 3000 to 4000 s.c.f. per pound mol aluminum. In any case, the gas is passed into the mixture until such time as the oxygen uptake rate becomes economically too low. At this point, a low molecular weight metalalkyl or metalalkyl hydride of the type previously mentioned and preferably an aluminumalkyl is added and the temperature allowed to increase while additional oxygen-containing gas is introduced into the mixture. As has previously been mentioned, it is advantageous to allow the temperature to increase during this second oxidation step to a temperature in the range 25 to 50° C. Surprisingly, few by-products are formed, and the oxidation proceeds rapidly. It has been previously thought that the final oxidation should be at low temperatures, since it has been in the latter stages of oxidation that the peroxides deteriorate into the carbonyl products previously mentioned. Since the latter third of the oxidation is conducted at room temperature or higher, there is no problem of precipitation, and a homogeneous solution of the alkoxide is obtained.

As previously mentioned, the alkoxides are convertible to alcohols by hydrolysis according to known methods or, in the alternative, can be converted to high molecular weight olefins by reverse displacement utilizing low molecular weight metalalkyl in the presence of a suitable catalyst such as nickel, all of which is known from the prior art.

To further illustrate the invention, several runs were made comparing the use of a reducing aluminumalkyl versus the absence of such a material.

Example I

A plant growth product (1642 grams, $m=3.9$, 4.60% Al) and dodecane (740 grams) were placed in a stirred Morton flask equipped for Warburg-type oxidation. Dry oxygen was admitted to the rapidly-stirred system, with the initial temperature at 14° C. Oxidation was continued until the adsorption rate decreased to less than 50 ml. per minute and 101,000 ml. (STP, 108% of theoretical amount) had been adsorbed. The temperature was decreased gradually during the oxidation period to approximately 0° C. at the end. The 0° solution contained 0.145 mole of peroxide (as determined by iodimetric titration) per mol of aluminum. Diethylaluminum hydride (88 g. in 131 g. dodecane) was added dropwise while maintaining the temperature in the range 0 to 2.5° C. Subsequently the solution was warmed to 25° C. and oxidized to completion. An aliquot of the final solution (28.3 g., 3.58 weight percent Al.) diluted with decane (12.9 g.) was hydrolyzed with $H_2SO_4$. Analysis of the product (3.73 weight percent hydroxyl) indicated, after correction for the excess ethanol present, showed a yield of 98 mol percent alcohol based on aluminum.

Example II

The procedure of Example I was repeated except triethylaluminum (72 g. in 1089 solvent) was added to the cold peroxidic (12.3 mol percent "0" based on Al) solution rather than the diethylaluminum hydride.

Example III

The procedure of Example I was repeated except no low molecular weight aluminumalkyl was utilized. The product was extremely viscous (turning overnight to a firm gel) and could not be further oxidized at room temperature.

Example IV

Growth product, plant quality (164 grams, $m=3.9$, 4.60 weight percent Al), was treated with oxygen in the apparatus of Example I at 32° C. until approximately two-thirds of the theoretical amount had been adsorbed, and then the oxidation was completed at 27° C. (total oxygen absorbed=1.10 times theoretical). Hydrolysis of 21.8 g. aliquot diluted with 21.3 g. of dodecane gave a product containing 3.66 weight percent hydroxyl or an alcohol yield of 87 mol percent.

The data from the above runs is summarized in the Table.

TABLE

[Oxidation of m=3.9 growth product (as 1.2 M solution)]

| Run | Oxid. Temp. (°C.) | Reducing Agent (g./100 g. AlR₃) | Alcohol Yield (mol percent) | Odor Level* of 12-14 Alcohol Sulfate | |
|---|---|---|---|---|---|
| | | | | Initial | Aired |
| 1 | 14(start), 0 (end) | HAl(C₂H₅)₂ (7.6) | 98 | 0.7 | 0.3 |
| 2 | do | Al(C₂H₅)₃ (6.3) | 92 | 0.9 | 0.2 |
| 3 | do | None | 89 | | |
| 4 | 32(2/3)/27(1/3) | do | 87 | 1.6 | 0.8 |

*Odor level is determined by a consensus of a panel of 5 evaluators each rating the odor level from 0 to 5, with 0 being no odor and 5 being intense odor, and the results are averaged. The initial odor is determined immediately after sulfonating, the bottles are uncapped and allowed to stand 10 minutes and the aired level determined.

From the above table, it is readily apparent that the method of the invention results in higher yields of the desired alcohol at the expense of odor-carrying impurities.

The invention has been described in some of its preferred embodiments; those skilled in the art will readily see a number of modifications which can be made without departing from the scope thereof.

Having thus described the invention, I claim:

1. A method of oxidizing aluminum alkyls containing alkyl groups of varying carbon atoms, said method comprising in combination contacting said aluminum alkyls with an oxygen-containing gas until 1.1 to 1.3 times the theoretical amount of oxygen is introduced, initially introducing the gas at a temperature not in excess of about 25° C., and gradually reducing the temperature of the reaction to a temperature no higher than about 5° C. by the time about two-thirds of the oxidation is completed and until the oxygen uptake falls off to an undesirable rate, thereafter adding a metal alkyl wherein the alkyl groups contain not more than 4 carbon atoms and the metal is selected from the group consisting of aluminum, boron, lithium and alloys of such metals, thereafter raising the temperature of the reaction to within the range of 20 to 50° C. and completing the addition of the oxygen-containing gas until 1.1 to 1.3 times the theoretical oxygen required has been added.

2. The method of claim 1 wherein the oxidation of the aluminum trialkyl is carried out in the presence of an inert solvent.

3. The method of claim 2 wherein the aluminum trialkyl to be oxidized is growth products obtained by reacting a low molecular weight aluminumalkyl with ethylene.

4. The method of claim 3 wherein the "$m$" value of the growth product is in the range 2 to 6 and the inert solvent is a hydrocarbon.

5. The method of claim 4 wherein the low molecular weight metalalkyl is an aluminumalkyl.

6. The method of claim 5 wherein the aluminumalkyl is dialkylaluminum hydride.

7. The method of claim 5 wherein the aluminumalkyl is triethylaluminum.

8. The method of claim 5 wherein the continued addition of oxygen after addition of the low molecular weight metalalkyl is carried out at a temperature in the range 20 to 50° C.

9. The method of claim 8 wherein the amount of oxygen utilized is in the range 600 to 1000 s.c.f. per mol aluminum.

References Cited

UNITED STATES PATENTS

| | | |
|---|---|---|
| 2,863,895 | 12/1958 | Kirshenbaum et al. |
| 2,892,858 | 6/1959 | Fiegler. |
| 2,959,607 | 11/1960 | Werber et al. |
| 3,042,696 | 7/1962 | Aldridge. |
| 3,087,954 | 4/1963 | McClaflin. |
| 3,153,076 | 10/1964 | Wood et al. |

OTHER REFERENCES

Feiss: Organometallic Chemistry, Reinhold Publ. Corp. N.Y. (1960), pp. 206, 236, 237 and 239.

TOBIAS E. LEVOW, *Primary Examiner.*

H. M. S. SNEED, *Assistant Examiner.*